US008451755B2

(12) United States Patent
Chin (10) Patent No.: US 8,451,755 B2
(45) Date of Patent: May 28, 2013

(54) ACCESS CONTROL TO TELECOMMUNICATIONS CONFERENCE HOSTING RESOURCES (75) Inventor: Jason H Chin, Needham, MA (US)

(73) Assignee: British Telecommunications public limited company, London (GB)

( * ) Notice: Subject to any disclaimer, the term of this patent is extended or adjusted under 35 U.S.C. 154(b) by 243 days.

(21) Appl. No.: 12/867,826

(22) PCT Filed: Jan. 23, 2009

(86) PCT No.: PCT/GB2009/000192
§ 371 (c)(1),
(2), (4) Date: Aug. 16, 2010

(87) PCT Pub. No.: WO2009/101381
PCT Pub. Date: Aug. 20, 2009

(65) Prior Publication Data
US 2010/0322113 A1 Dec. 23, 2010

Related U.S. Application Data (63) Continuation-in-part of application No. 12/071,154, filed on Feb. 15, 2008, now abandoned.

(30) Foreign Application Priority Data

May 15, 2008 (EP) ..................................... 08251709

(51) Int. Cl.
*H04L 12/16* (2006.01)
(52) U.S. Cl.
USPC .. 370/261; 370/260; 379/202.01; 379/203.01
(58) Field of Classification Search
None
See application file for complete search history.

(56) References Cited

U.S. PATENT DOCUMENTS 5,373,549 A * 12/1994 Bales et al. ................. 379/93.21
5,555,441 A * 9/1996 Haddad ........................... 725/93
(Continued)

FOREIGN PATENT DOCUMENTS

| CA | 2 551 187 | 10/2006 |
| DE | 101 38 151 A1 | 2/2002 |
| EP | 1 309 164 A2 | 5/2003 |
| EP | 1 523 166 | 4/2005 |
| WO | 01/47224 A | 6/2001 |

OTHER PUBLICATIONS

Office Action (13 pgs.) dated Oct. 14, 2010 issued in related U.S. Appl. No. 12/071,154.

(Continued)

*Primary Examiner* — Donald Mills
(74) *Attorney, Agent, or Firm* — Nixon & Vanderhye P.C.

(57) ABSTRACT

Telecommunications conference hosting resources are allocated for the management of a conferencing function by generating a validation for each of a plurality of conference hosts to permit access to the telecommunications conference hosting resources for a predetermined duration selectable by the respective conference hosts. Telecommunications conference hosting resources are allocated to each conference host for the predetermined duration so as to allow the conference host to make multiple accessions to the telecommunications conference hosting resources at any time before the expiry of the predetermined duration. The telecommunications conference hosting resources are connected to the conference host in response to such accessions. Different conference hosts may be validated for use of the same resources for different durations. Allocation of resources is prioritized for the conference hosts according to the duration selected by each of the conference hosts.

12 Claims, 6 Drawing Sheets

U.S. PATENT DOCUMENTS

| | | | |
|---|---|---|---|
| 5,631,904 A | 5/1997 | Fitser et al. | |
| 5,692,034 A | 11/1997 | Richardson, Jr. et al. | |
| 6,430,281 B1 * | 8/2002 | Morley et al. | 379/210.01 |
| 7,596,215 B2 * | 9/2009 | Vance et al. | 379/202.01 |
| 2003/0072428 A1 | 4/2003 | Stern et al. | |
| 2004/0125932 A1 | 7/2004 | Orbach et al. | |
| 2004/0125933 A1 | 7/2004 | Jun et al. | |
| 2004/0170265 A1 | 9/2004 | Benco et al. | |
| 2005/0018827 A1 | 1/2005 | Himmel et al. | |
| 2005/0069115 A1 * | 3/2005 | McKnight et al. | 379/202.01 |
| 2006/0008065 A1 | 1/2006 | Longman et al. | |
| 2006/0285657 A1 | 12/2006 | Lippke et al. | |
| 2007/0121859 A1 | 5/2007 | Smelyansky et al. | |
| 2008/0226051 A1 * | 9/2008 | Srinivasan | 379/202.01 |
| 2009/0179983 A1 * | 7/2009 | Schindler | 348/14.08 |

OTHER PUBLICATIONS

Partial European Search Report dated Jun. 23, 2008 in EP 08 25 0201.

Extended European Search Report dated Jul. 28, 2008 in EP 08 25 0201.

Extended European Search Report dated Jun. 16, 2008 in EP 08 25 0196.

European Search Report dated Nov. 10, 2008 in EP 08 25 1709.

International Search Report for PCT/GB2009/000192, mailed Mar. 20, 2009.

Office Action (3 pgs.) dated Apr. 27, 2012 issued in corresponding European Application No. 09 784 525.9.

* cited by examiner

ACCESS CONTROL TO TELECOMMUNICATIONS CONFERENCE HOSTING RESOURCES

This application is the U.S. national phase of International Application No. PCT/GB2009/000192 filed 23 Jan. 2009, which designated the U.S. and claims priority to EP Application No. 08251709.5 filed 15 May 2008, and is a continuation-in-part of U.S. application Ser. No. 12/071,154 filed 15 Feb. 2008 now abandoned, the entire contents of each of which are hereby incorporated by reference.

BACKGROUND AND SUMMARY

This invention relates to the control of access to communication facilities and in particular to audio conferencing facilities. Such facilities provide the capability for a number of users to participate in a telecommunications session by connecting through a single point of contact. Typically this is achieved by arranging for each user to establish connection to a conference call platform. The platform provides a bridge through which all the participants can be connected so that each one can hear everything said by the others. The platform may provide facilities to prevent cross talk, feedback, etc, and may provide a spatialisation capability to allow different participants' voices to seem to emanate from different directions relative to a listener.

Simple three-way calling can be achieved in many networks by one of the parties to an existing two-way call establishing a second call, to a third party, and then setting up a "bridge" between the calls. The addition of a fourth or subsequent party, if possible at all, requires the initiating party to set up individual calls to each one, which is cumbersome. Moreover, this facility is of limited application as the initiating party must remain on the call even if the other two parties want to continue without him. The third and subsequent parties do not initiate their own participation but have to be called in. In contrast, dedicated conferencing facilities provide a bridge into which each intending user may connect, making it possible for each user who intends to participate to dial in to a previously-advised number when he is ready. The burden of setting up and controlling the conference is largely passed to the network-based conferencing facility, rather than being the responsibility of one of the participants.

Two classes of conferencing facility are typically available, known as booked and reservationless types. In a booked system, such as that described in U.S. patent application US2004/0125933 (Peng Jun et al), the organiser sets up the conference in advance and advises invitees of the access details (the number to dial and any passcode). The call may be limited to nominated participants. This arrangement is secure, but requires advance notification to all proposed participants. It also ensures that capacity is available at the time agreed for the conference—if capacity is not available at the desired time, a user's attempt to make a reservation will fail. He can of course attempt to reserve at some other time, and whatever time he is eventually able to reserve is guaranteed. The use of access control requires the participants to remember, or record, the access details, and to enter them when the conference is to be joined. This can be inconvenient, for example if the user is in a situation where the user is mobile and does not have passcode information readily available to him.

Another difficulty is that a host typically does not have visibility to his attendees' calendars as these may operate within a separate scheduling interface (typically a web-based interface such as Microsoft Outlook®), which may be incompatible with the one used by the host (chairman) to set up the conference. Consequently, the host must have either previously checked invitees' calendars before booking, or must book the conference without being certain that the required attendees will be available. Moreover, if a meeting time has to be altered after the initial booking has been made, then the host must make the update in both the conference interface and the scheduling interface.

Reservationless conference systems require an attendee simply to dial in to a reservationless conference using a static and predetermined passcode. This number may of course be stored on a "soft key" on the handset if used regularly, to avoid the need to dial a large number of digits. Such a system is suitable for less structured situations, where conference hosts do not wish to pre-book the facility but wish to have the use of the facility whenever they need it. However, without a reservation system there can be no guarantee that there will be adequate capacity at the required time—the system has to arbitrate between competing requests, whether on a "first come, first served" basis, or by giving priority to certain individual users (potentially resulting in premature termination of other users' conferences).

Furthermore, the call flow in existing reservationless systems is very cumbersome to conference hosts. The standard CISCO "MeetingPlace" system requires the conference host to enter two pieces of information—Profile Number and Profile Password—as well as intermediate DTMF entries to confirm what was entered. This lengthy entry process for hosts often leads to increased amount of helpdesk assistance to start meetings and also leads to customer dissatisfaction. For mobile users, the complexity of access makes it difficult to perform this call flow on a small mobile phone where key strokes are not always ergonomically easy.

Another disadvantage of the reservationless type is that, once the access code is provided to a participant to a particular conference call, that participant has access to any subsequent conference calls run by the same host, whether or not he is invited. To prevent such gatecrashing, the user would have to change his passcode, and advise the new code to all intended participants of further conferences, thereby negating one of the potential advantages of the reservationless type.

It would be desirable to provide users with Email Client "Plug-in" applications for scheduling of one-time conferences. This type of plug-in would allow a user to schedule a conference from within the process of creating a calendar invitation, rather than scheduling the conference via a separate interface and then copying the booked details into the calendar invite. However, this requires either the development, maintenance, and upgrading of a specific mail client plug-in application for each mail client type, or the deployment and use of a conference bridge manufacturer's client application. In the latter case, the mail client plug-in would communicate directly with the bridge platform, so the service provider would not have central visibility of the meeting being scheduled for that bridge. This can lead to a variety of operational issues, such as passcode conflicts where the core reservation system issues a passcode that has already been created by the bridge for a mail client booking request that went directly to the bridge.

Therefore, although the mail client scheduling plug-in application offers an attractive benefit to customers, the support costs to the service provider are significant and not easily scalable.

The present invention provides an alternative approach to the provision of conferencing facilities that overcome these difficulties, and provides many of the capabilities of both booked and reservationless conferences in a single unified system.

Access to a teleconferencing system is granted to a prospective attendee (1) for a predetermined duration, by dating the user for access to the facilities (107) for a predetermined duration, and allocating resources (110) to the user for the predetermined duration. This duration can be defined in terms of an expiry date, or a predetermined number of separate occasions for which access to the facilities is permitted, or a combination of both. To allow a user to break out of a conference and rejoin it, multiple accessions within a predetermined period (such as one day) may be counted as a single accession in counting towards the predetermined number of accessions. Different users may be validated for use of the same resources for different durations. This arrangement provides many of the existing capabilities of both booked and reservationless conferences in a single unified system. A reservationless conference facility can be emulated by specifying a very large permitted number of calls, or an expiry date in the distant future. To emulate a booked call, an individual attendee can be limited to just one accession, or to a very limited time range. Unlike a conventional booked call, the actual conference time can be rescheduled, provided it remains within the selected constraints. To encourage responsible use of the reservation facilities, allocation of resources may be prioritised for users having the most restricted duration of access. In particular, the guarantee of availability for a pre-booked call can be emulated by the prioritisation of calls for which the permitted users have the most restricted validity terms. This provides a form of demand-management, as the network can identify the number of passcodes valid at any one time and schedule resources accordingly.

According to the invention, a prospective attendee is given access to a conference facility for a predetermined duration. Specifically, there is provided a method of allocating telecommunications facilities for the execution of a conferencing function, comprising the steps of validating a user to permit access to the facilities for a predetermined duration selectable by the user, allocating the resources to the user for the predetermined duration, and connecting said resources to the user, in response to commands from the user, on one or more occasions before the expiry of the predetermined duration. This duration can be defined in terms of an expiry date, or a predetermined number of separate occasions that access to the facilities is permitted, or a combination of both. To allow a user to break out of a conference and rejoin it, multiple accessions within a predetermined period (such as one day) may be counted as a single accession in counting towards the predetermined number of accessions. Different users may be validated for use of the same resources for different durations.

To encourage responsible use of the reservation facilities, allocation of resources may be prioritised for users having the most restricted duration of access.

The invention also embraces a telecommunications conferencing facility comprising a provisioning facility for allocating resources to a user and a validation processor for creating validation information, wherein the provisioning facility and validation processor control access to the resources such that the user is permitted access to the resources on one or more occasions before the expiry of a predetermined duration selectable by the user. A timer and/or counter may be employed to disable access after elapse of a predetermined period or number of accessions.

In the preferred embodiment access is authorised by issuing a passcode having a limited validity term which may be defined either in terms of an expiry date, or by the number of separate occasions that access will be permitted, or a combination of both. A reservationless conference facility can be emulated by specifying a very large permitted number of calls, or an expiry date in the distant future. To emulate a booked call, an individual attendee can be limited to just one accession, or to a very limited time range. Advantageously, and unlike a conventional booked call, the actual conference time can be rescheduled, provided it remains within the selected constraints.

The booking process is much simplified, as the conference host does not need to define the exact conference details (date, time), only one "expiration date" needs to be selected.

Another feature of booked calls, the guarantee of availability, can be partially emulated by the prioritisation of calls for which the permitted users have the most restricted validity terms. This provides a form of demand-management, as the network can identify the number of passcodes valid at any one time and schedule resources accordingly. Prioritising the most restricted-validity passcodes would discourage profligate use of passcodes with unnecessarily extensive validity

BRIEF DESCRIPTION OF THE DRAWINGS

An embodiment of the invention will now be described with reference to the Figures, in which.

DETAILED DESCRIPTION OF PRESENT EXAMPLE EMBODIMENTS

Figure 1:
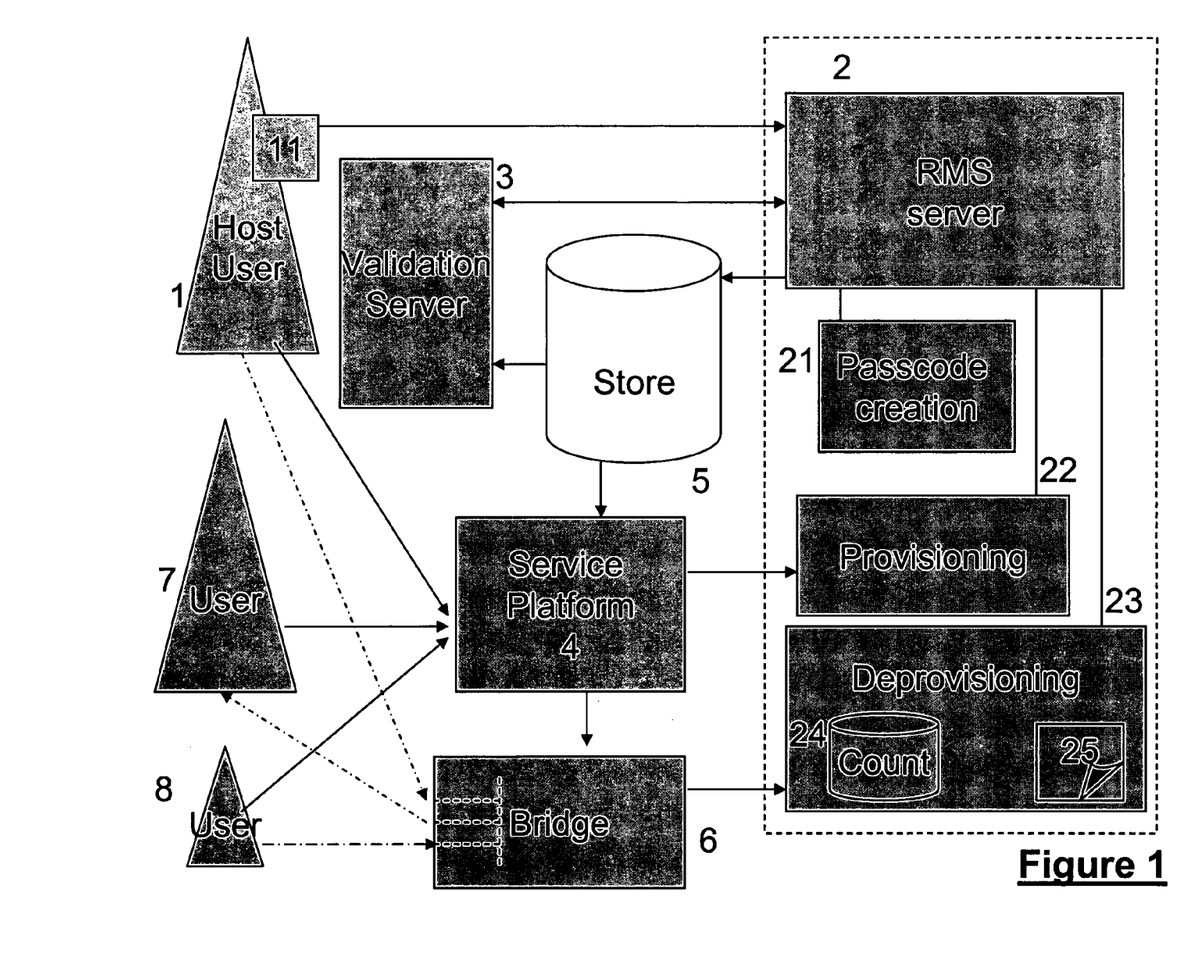
FIG. 1 is a schematic diagram illustrating the elements that co-operate to perform the invention

FIG. 1 depicts three user terminals 1, 7, 8 and the various network-based elements which co-operate to establish the facility. These are a reservations management system (RMS) (having a server 2 giving access to a passcode creation subsystem 21, a provisioning subsystem 22 and a deprovisioning subsystem 23) a validation server 3, a conference service platform 4, a database 5, and the conference bridge 6 which allows connection between the users.

Figure 2:
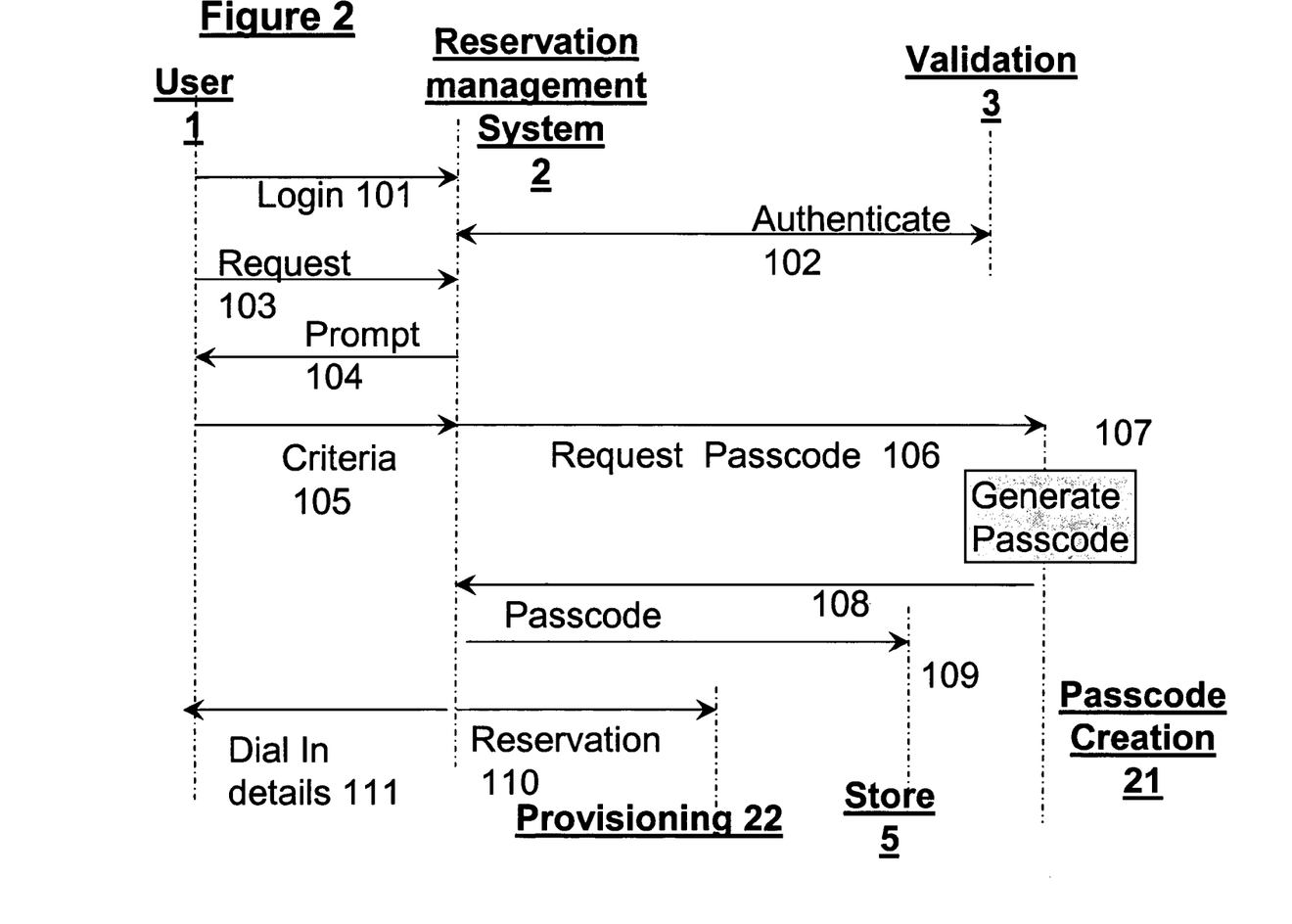
FIG. 2 is a flow chart illustrating the processes performed in allocating a passcode.

FIG. 2 illustrates the processes performed by the user setting up the conference facility. Initially, the user 1 who is to set up the conference booking accesses the reservation management system 2 by means of an internet browser 11 (step 101). The reservation management system 2 runs an authentication process (102) on the validation server 3 (username/password credentials or via an automated Single Sign On authentication model) to identify the user 1. This identifies to whom any associated usage should be attributed.

Having gained access to the reservation management system 2 the user next requests a passcode for access to the facility (step 103). He is prompted to define the expiration criteria of the required facility (step 104). The user responds with the request details (step 105).

The reservation management server 2 now generates a request (step 106) via an API integration to the reservations subsystem 21 to create a new passcode, passing the details of the requesting user, the expiration date, and that the booking type is a limited validity type.

The reservation subsystem 21 generates a unique set of passcodes (step 107), and passes this information, with dial-in details, back to the requesting server 2 (step 108). In this process, the reservations system also records this information in its reservations database 5 (step 109).

The reservations system's provisioning agent 22 can now reserve the appropriate audio and web mixing equipment to provide the actual audio and web conferencing facilities to the users during conferences (step 110). Since the booking can be used at any time prior to expiration, the provisioning agent should book the required equipment in the same way as a conventional "reservationless" type. The booking is now ready for use.

The server 2 can now provide the host user 1 with dial-in details and a passcode (step 111), which he can communicate to the participants 7, 8 whom he wishes to invite to the conference.

More than one passcode may be made valid for the same conference access code. This would allow an individual user 8 to be given temporary access to a conference facility used on a longer-term basis by other users 1, 7, without having to give the regular users a different passcode just to accommodate a single visitor. This could be achieved by responding to the prompt 104 by specifying criteria 105 requesting modification of an existing reservation. In this case, of course, no additional reservation is necessary (step 110) unless the facilities reserved are insufficient for the larger number of participants.

Figure 3:
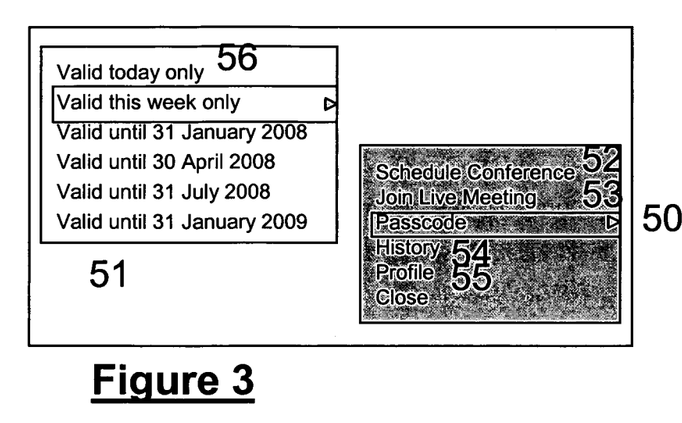
FIGS. 3 and 4 are illustrative screenshots illustrating an interface suitable for the process of FIG. 2
Figure 4:
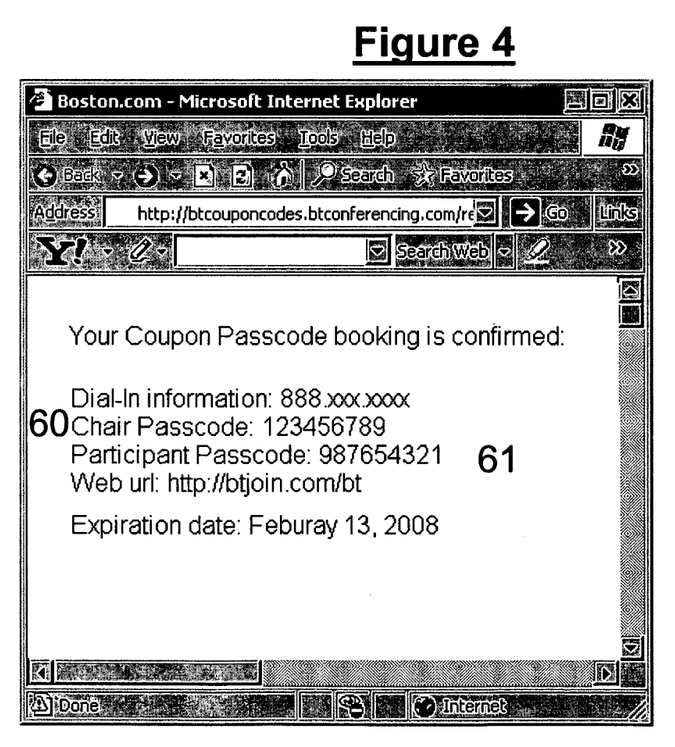

FIGS. 3 and 4 are screen shots of a plug-in application providing simplified access to obtaining a passcode. This plug-in allows the capability to make a booking to be made always available when the user's computer is operating. To execute a booking the user simply would right-click on the "passcode" icon 50 and select the proper expiration desired from the menu 51.

Once the selection is made, the reservation process (steps 107-109) are initiated. A unique set of passcodes (step 107), are created, and this information, with dial-in details, is sent back to the requesting server (step 108). The dial-in and passcode details are provided back to the user in a new web browser that is opened automatically, a screen shot of which is illustrated at FIG. 3.

This screen allows the user to issue a participant passcode 61 to any other user he desires to participate. More complex functions, such as issuing several passcodes of different validity for the same conference, can be accessed from the server using the chair passcode 60. Other functions are possible using the plug-in. For example the screen shown in FIG. 3 offers single-click shortcut access to various other capabilities typically offered within online scheduling portals, such as to schedule a conference by opening a new web browser, authenticating the user, and bringing the user directly to the schedule meeting page (icon 52)

to join an existing meeting, by opening a new web browser and bringing the user directly to the entry page for the web conferencing portion of a conference (icon 53).

to connect the user directly to a booking history search page, where details of the user's future and past bookings are displayed (icon 54)

to connect the user to a user profile page presenting the contact details currently stored for the user (icon 55).

Configuration of the plug-in allows specific user preferences to be set so that the plug-in can offer the simple experience targeted. Authentication credentials need to be created, and other factors may be required such as the user's preferred language and local timezone (needed to define the time of expiry of a passcode if it cannot be assumed that all users of the server are in the same time zone as the server or each other). Because it is not reliant upon integration with a mail client, the generation of the passcode is compatible with users using different mail clients.

Configuring the application to be accessible this way means the user can book a meeting at any time without having to first open a mail client to get to the scheduling capability, as is required with existing mail client scheduling plug-ins. This allows an impromptu meeting to be created by simply "clicking" on the icon and selecting Passcode→Valid today only (56). The dial-in details can then be returned ready for distribution by any desired means.

The user gets a newly generated passcode and dial-in details returned to him, saving time and also providing a level of security typically associated with one-time bookings because of the on-the-spot generation of the passcode. Because the passcode is available until expiration, the user can confidently include the dial-in details in any meeting invittion, and then change the date/time of that meeting to fit people's schedules, without worrying about the changes being reflected on the conferencing system.

In the preferred embodiment, reservationless and booked conferences are merely special cases, and the process is the same for all types, but in other embodiments special procedures may be available to provide authentication for such types—for example to emulate existing prior art interfaces for such procedures, with which existing users will already be familiar.

Figure 5:
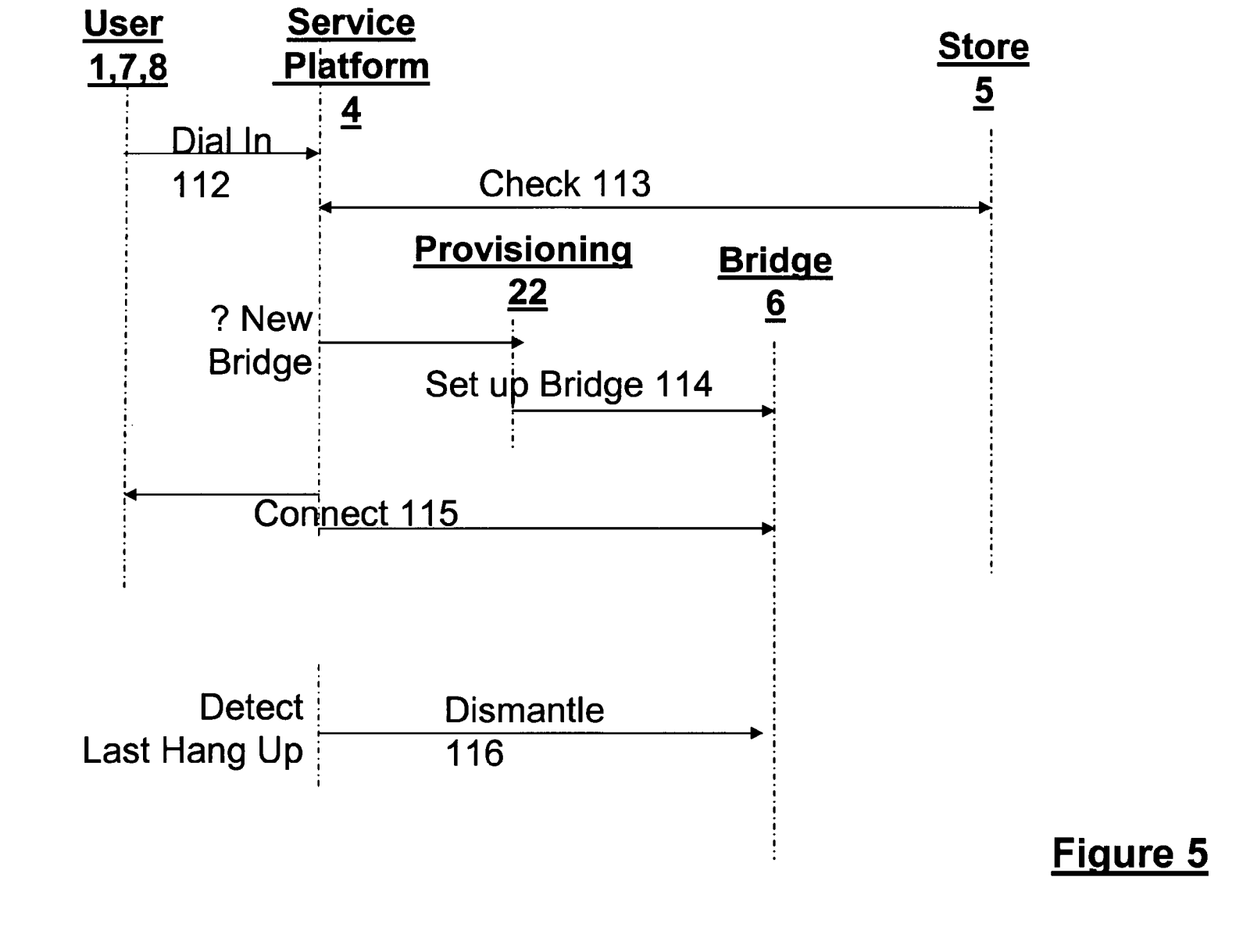
FIG. 5 is a flow chart illustrating the processes performed in running a conference using the passcodes.

FIG. 5 illustrates the processes that are performed when a conference call takes place. Each user (1, 7, 8) dials in to the conference service platform 4 (step 112) and gives the appropriate conference identity and passcode which is verified by reference to the details maintained in the store 5 (step 113). The first user to do so (who need not be the host 1) also causes the provisioning function 22 to use the resources previously reserved (step 110, FIG. 2) to establish the required conference bridge 4 (step 114) to which the user is then connected (step 115). Other users may then connect to the bridge by performing the same process of dialling in (112, 113) and each validating a valid passcode for that conference. The service platform, recognising that the required bridge 6 is already in place, connects the user 1, 8 (step 115) to it.

When the last caller hangs up, the bridge 6 is disconnected (step 116).

This process is conventional except that more than one passcode, each having a different validity, may be validated for the same conference bridge 6. However, each connection by a user to the bridge is monitored, as will now be discussed.

Figure 6:
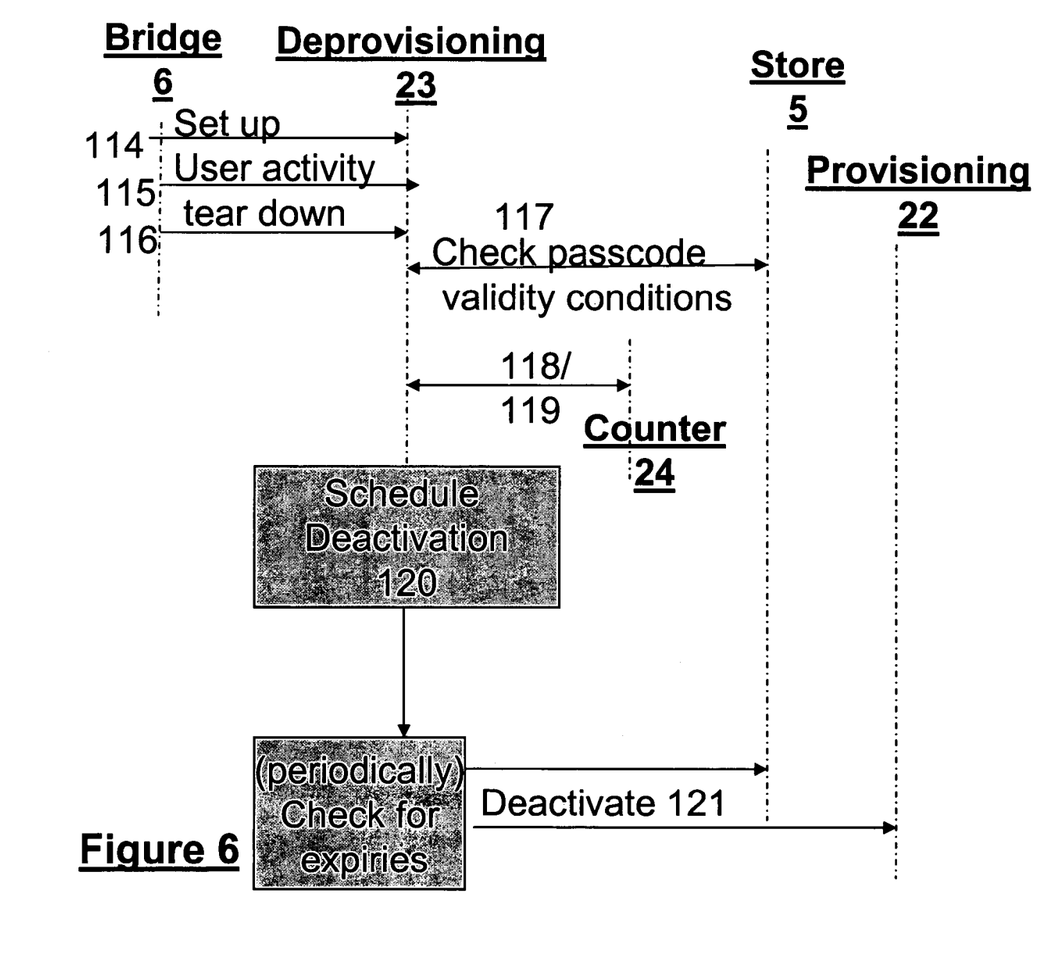
FIGS. 6 and 7 are flow charts illustrating the deprovisioning process.
Figure 7:
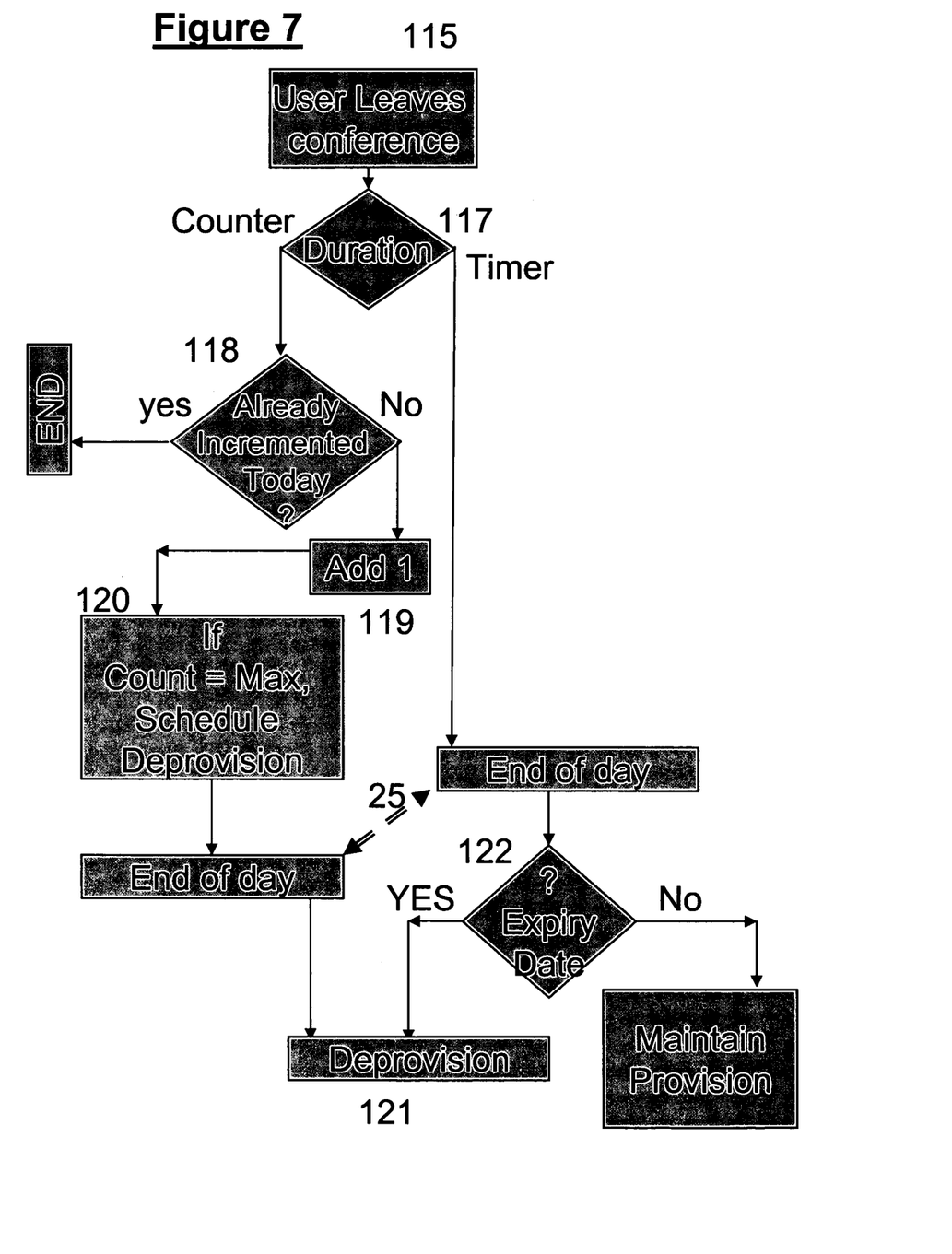

FIGS. 6 and 7 illustrate the deprovisioning process. This process may be triggered by elapse of time, incrementation of a usage counter, or both, depending on the validity conditions selected for the passcode.

The deprovisioning agent 23 monitors and records bridge conference set-up and tear-down activity (114, 116) and records individual users' usage of conference facilities (step 115). The deprovisioning agent 23 accesses passcode validity data from the store 5, (step 118) and upon each use of a passcode limited by number of uses, a counter 24 is incremented (step 119). If the count has attained the maximum number of "uses" permitted, the deprovisioning function 23 schedules deactivation of the passcode (step 120) on the audio/web mixing equipment. If the maximum is not reached, then it does not trigger any deprovisioning action.

Provision is made 118 for the count 119 to not be incremented for second and subsequent uses occurring within a predetermined duration of an increment having taken place.

This allows users of passcodes limited to a specified number of connections to leave and return to the same conference without further incrementing their tally if, for instance, they need to interrupt their connection to the conference.

It is desirable that the deactivation process itself (121) does not take place immediately but, for example, as a periodic process (once a day, for example) prompted by a date function 25. This again allows users of "once only" passcodes to leave and return to the same conference if, for instance, they are interrupted.

In addition this periodic process 121 identifies any time-limited bookings that are expiring (step 122, FIG. 7), and deprovisions any that have expired by removing the reservations of the audio/web mixing equipment forming the bridge 6 from the provisioning function, and updating the store 5 so that the expired passcodes no longer allow for usage.

What is claimed is:

1. A method of allocating telecommunications conference hosting resources for the management of a conferencing function, comprising:
   generating a validation for each of a plurality of conference hosts to permit access to the telecommunications conference hosting resources for a predetermined duration selectable by the respective conference hosts,
   allocating telecommunications conference hosting resources to each conference host for the predetermined duration so as to allow the conference host to make multiple accessions to the telecommunications conference hosting resources at any time before the expiry of the predetermined duration, and
   connecting said telecommunications conference hosting resources to the conference host in response to such accessions, wherein:
   different conference hosts may be validated for use of the same resources for different durations, and
   allocation of resources is prioritized for the conference hosts according to the duration selected by each of the conference hosts.

2. The method according to claim 1, wherein the duration is defined in terms of an expiry date.

3. The method according to claim 1, wherein the duration is defined in terms of a predetermined number of separate occasions upon which access to the facilities is permitted.

4. The method according to claim 3, wherein the facilities remain accessible for a predetermined period after the predetermined number of accessions has been reached.

5. The method according to claim 1, wherein the resources include access to a conference bridge.

6. A telecommunications conferencing facility comprising:
   a provisioning facility for allocating resources to each of a plurality of conference hosts, and
   a validation processor for creating validation information, wherein:
   the provisioning facility and the validation processor control access to conferencing resources such that a each conference host is permitted multiple accessions to the conference facilities at any time before the expiry of a predetermined duration selectable by that conference host, and
   the provisioning system is configured to prioritize access to resources for each conference host according to the predetermined duration selected by the respective conference hosts.

7. The facility according to claim 6, comprising a timer to disable access after elapse of a predetermined period.

8. The facility according to claim 6, comprising a counter to determine the number of times the user accesses the resources and disable access after a predetermined number of such accessions.

9. The facility according to claim 8, wherein the counter comprises a delay timer to maintain accessibility for a predetermined period after the predetermined number of accessions has been reached.

10. The facility according to claim 6, further comprising a conference bridge facility, access to which is controlled by the provisioning facility.

11. The method according to claim 1, wherein the allocation of resources is prioritized based on the most restricted duration of at least one of the conference hosts.

12. The facility according to claim 6, further comprising wherein the allocation of resources is prioritized based on the most restricted duration of at least one of the conference hosts.

* * * * *